W. DURYEA.
Velocipede Wheel.
No. 97,176.
Patented Nov. 23, 1869.
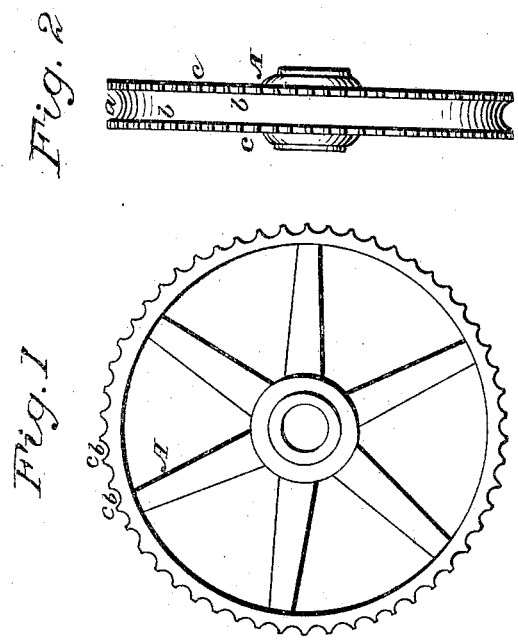

UNITED STATES PATENT OFFICE.

WRIGHT DURYEA, OF GLEN COVE, NEW YORK.

IMPROVED VELOCIPEDE-WHEEL.

Specification forming part of Letters Patent No. 97,176, dated November 23, 1869; antedated November 12, 1869.

*To all whom it may concern:*

Be it known that I, WRIGHT DURYEA, of Glen Clove, in the county of Queens and State of New York, have invented a new and useful Improvement in Velocipede-Wheels, of which the following is a full, clear, and exact description, reference being had to the accompanying drawings, forming part of this specification, and in which—

Figure 1 represents a side view of a velocipede-wheel constructed in accordance with my improvement, and Fig. 2 an edge view thereof.

Similar letters of reference denote corresponding parts.

My invention consists in a novel construction of velocipede wheel or wheels, by forming them with flutes on their peripheries and corrugated edges to the sides of the flutes, to facilitate the running of such vehicles on ice or slippery ground, and whereby the same may readily be adapted to running on ordinary surfaces.

Referring to the accompanying drawings, A represents a velocipede-wheel constructed on its periphery with one or more flutes, a, arranged to surround or encircle the same, and bordered by corrugated edges formed by depressions b, of such shape or character as to leave plain intervening surfaces c between them, in contradistinction to sharp or pointed projections or protuberances of any kind from the tread or periphery proper of the wheel.

Velocipedes provided with wheels thus constructed may readily be run on ice or slippery ground without much or any liability to slip, and afford every facility for steering, the flute or flutes a aiding in preserving an upright position to the vehicle, and rendering it easier to ride, while the corrugations in the edges which border the flutes effect the necessary grip or hold on the running-surface. Such construction also admits of a ready conversion of such wheels to adapt them to running on ordinary surfaces by simply springing or inserting an india-rubber or other suitable rope-shaped annular band or bands in the flute or flutes a, made in and around the periphery of the wheel, of sufficient thickness to project beyond the corrugated edges which border the flutes. When the wheels are made with more than one flute, the same should be arranged parallel to each other.

What is here claimed, and desired to be secured by Letters Patent, is—

A velocipede-wheel constructed in or around its periphery with one or more flutes, bound or bordered by corrugated edges, substantially as specified.

WRIGHT DURYEA.

Witnesses:
FREDK. HAYNES,
J. W. COOMBS.